MAGNETIC CONTROL CIRCUITS
Filed May 2, 1958 2 Sheets-Sheet 1
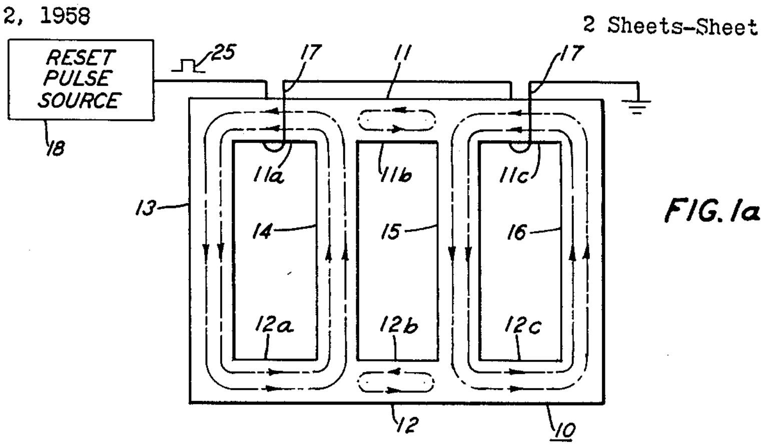
FIG. 1a
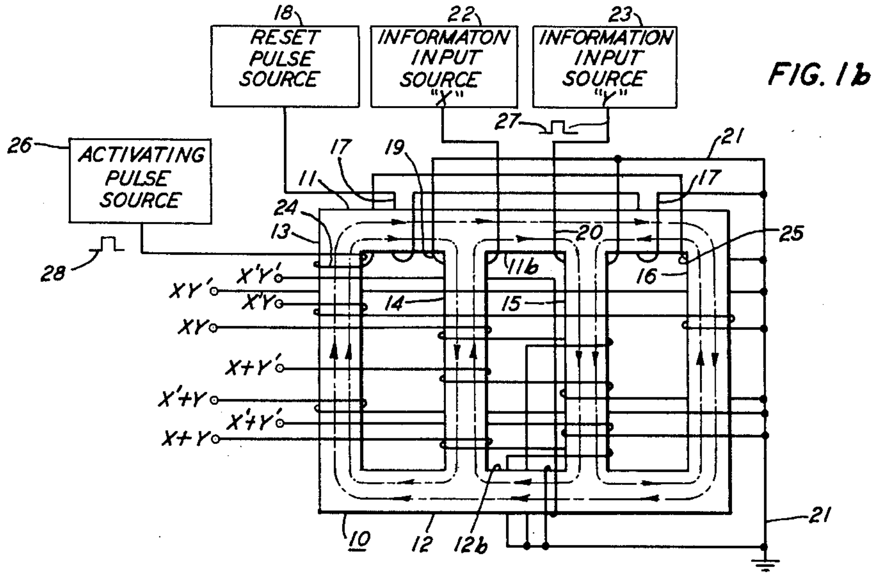
FIG. 1b
| FUNCTION | RUNGS AND BRIDGE SWITCHED 13 | 14 | 15 | 16 | 12b |
|---|---|---|---|---|---|
| X'Y' | 2 | 2 | 2 | 2 | 0 |
| XY' | 1 | 0 | 1 | 2 | 1 |
| X'Y | 2 | 1 | 0 | 1 | 1 |
| XY | 1 | 0 | 0 | 1 | 1 |
| X'+Y' | 2<br>1<br>2 | 2<br>0<br>1 | 2<br>1<br>0 | 2<br>2<br>1 | 0<br>1<br>1 |
| X+Y' | 2<br>1<br>1 | 2<br>0<br>0 | 2<br>1<br>0 | 2<br>2<br>1 | 0<br>1<br>1 |
| X'+Y | 2<br>2<br>1 | 2<br>1<br>0 | 2<br>0<br>0 | 2<br>1<br>1 | 0<br>1<br>1 |
| X+Y | 1<br>2<br>1 | 0<br>1<br>0 | 1<br>0<br>0 | 2<br>1<br>1 | 1<br>1<br>1 |
FIG. 2
INVENTOR
P. MALLERY
BY William H. Kamstra
ATTORNEY INVENTOR
P. MALLERY
BY
William H. Kamstra
ATTORNEY United States Patent Office 2,987,625

Patented June 6, 1961

2,987,625

MAGNETIC CONTROL CIRCUITS

Paul Mallery, Murray Hill, N.J., assignor to Bell Telephone Laboratories, Incorporated, New York, N.Y., a corporation of New York Filed May 2, 1958, Ser. No. 732,551
15 Claims. (Cl. 307—88)

Figure 3:
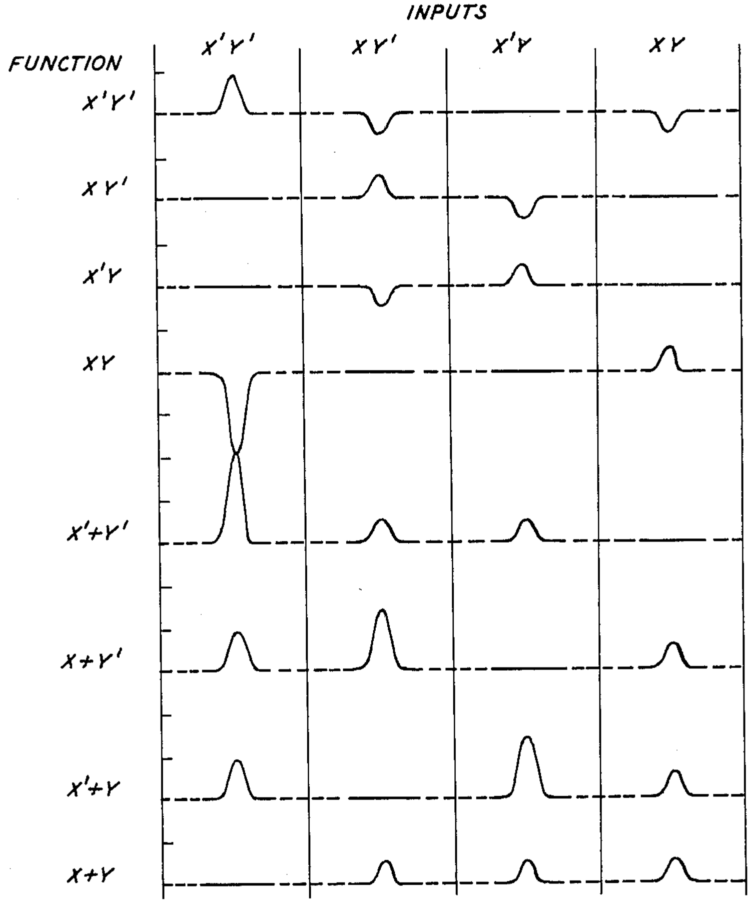

This invention relates to information processing circuits and more particularly to such circuits in which magnetic memory devices are employed as basic information storage elements.

Magnetic memory elements in which information is stored in the form of representative magnetic states are well known and have gained wide prominence in the data processing and switching art. Their extreme reliability, stability, and ease of maintenance have earned for such elements as, for example, the well-known toroidal ferrite cores, a favorable position in the binary information handling field. The ferrogmagnetics of which such cores are formed display substantially rectangular hysteresis characteristics and a binary information bit may be stored in a core as one or the other condition of remanent magnetization. The core then remains in the representative remanent condition until an applied magnetomotive force switches the core to the opposite remanent condition during the read-out phase of the information handling operation as is also well known.

Magnetic cores have been employed in numerous applications of specific circuits, and such arrangements as memory matrices, delay lines, and logic circuits, to name a few, are amply represented in the art. All of these applications have made highly advantageous use of magnetic cores. However, as is to be expected, many of the known circuit configurations have necessitated some modification in view of the inherent characteristics and manner of operation peculiar to the ferrite cores. Thus, for example, it is obvious that the switching of a core from either of its conditions of remanent magnetization to the other induces, in windings inductively coupled thereto, output voltages of equal amplitudes but opposite polarities depending upon whether the core is being "set" or "reset." In circuits operating repetitively, such as core logic circuits, the flux in a core must be reversed an even number of times with the result that for every forward transfer of information, that is, a flux reversal in one direction, there will also be a backward transfer of information, that is, a flux reversal in the opposite direction. Such a backward transfer is, in many instances, undesirable and must be countered in some manner. In a series arrangement in which each core is connected to an adjacent core by means of coupling loops and in which the cores are switched sequentially, such a backward transfer caused by the switching of one core may well in fact prevent the setting of a preceding core.

Normally in core logic circuits, for example, the above inherent effects are reduced and maintained within operating limits by the use of isolating diodes and also by suitably selecting the turns ratios of the core input and output windings. However, in connection with the former expedient, for obvious reasons it frequently becomes advantageous to reduce to a minimum the number of additional components, such as diodes, which are introduced into a circuit arrangement. One approach to this problem has been the use of a magnetic structure in which the problem of back transfer does not arise. Thus, in one well-known core geometry the closed flux loop is split at one side of the main aperture by providing a second aperture through the core body. Flux then, after passing through a main leg of the flux path, is divided between two subordinate legs formed by the additional aperture. By inductively coupling one winding to the main leg and two subordinate windings to one of the subordinate legs in one mode of operation, transfer of signals between the subordinate windings may be accomplished under the control of signals applied to the winding coupled to the main leg. Thus, if the magnetic flux through the main leg is completed through the subordinate legs in opposite directions, representative of one binary information value, transfer of signals between the subordinate windings will be indicative of that value. If however, the magnetic flux through the main leg be in a state other than that representative of the one information value, the flux will be divided between the subordinate legs in the same direction thereby preventing the necessary flux coupling to effect a transfer of signals between the subordinate windings. The absence of output signals in the latter case will, accordingly, indicate the presence in the core of the other binary information value. Interrogation of a core may, in the foregoing manner, be accomplished non-destructively, that is, without completely switching the remanent flux in the main leg of the flux circuit in the core representative of the particular binary value.

In the known multi-apertured core arrangement generally described above, however, a familiar operational limitation is encountered. As was the case with respect to the expedient of properly selecting the turns ratios of windings coupled to the toroidal cores to prevent back transfer of information due to destructive read out referred to hereinbefore, critical limitations apply to the character of the drive currents usable with the structure. In both cases the magnitude of the operational currents applied to the windings of the magnetic structure must be controlled within limits such as not to cause unwanted flux reversals or changes within the structure, or, in the case of individual toroidal cores, in cores other than the one being operated upon. The foregoing limitations inherent in conventional toroidal core and known multi-apertured core structures generally are well known and present important considerations in any attempt to increase interrogation and switching speeds by increasing the magnitude of the driving currents. Further, experience with known square loop ferrite structures has demonstrated that temperature changes encountered during normal circuit operation may require driving currents of magnitudes going beyond the permissible limits set by the restricted flux action demanded in particular circuit applications.

Accordingly, it is an object of this invention to provide a new and improved magnetic information handling device.

Another object of this invention is the provision of a magnetic structure adaptable for use in information handling circuits to realize a substantial reduction in circuit components.

It is still another object of this invention to provide a magnetic structure of a character such as to permit a wider margin in permissible drive current characteristics than has heretofore been possible with known magnetic storage devices.

A further related object of this invention and one based on the wider current margins made available through the realization of the immediately foregoing object is to provide such a magnetic structure which tolerates a greater range of temperature changes than is possible with conventional core devices.

A still further object of this invention is the generation of arbitrary functions of $n$ binary variables in a novel and more economical manner.

Another object of this invention is to provide a new and more simple logic switching circuit capable of performing any logic operation, which circuit is completely compatible with known information handling systems generally.

The principles of this invention in accordance with which the foregoing and other objects are realized may be better understood from a general description of an illustrative embodiment thereof. The structure and organization of such an embodiment is similar to that also described by T. H. Crowley and U. F. Gianola in the co-pending application Serial No. 732,549, filed May 2, 1958, now Patent No. 2,963,591, issued December 6, 1960. In that co-pending application a magnetic structure such as that here contemplated is described which comprises a pair of side rails having a plurality of transverse members disposed in a spaced relationship therebetween, each of the transverse members and side rails being formed of a magnetic material displaying a substantially rectangular hysteresis characteristic. A substantially ladder-like structure is thus presented and it may be convenient for purposes of description to regard the transverse members as rungs of such a ladder. The side rails together with the rungs present a plurality of closed magnetic-flux paths and it is obvious that any flux induced in the first rung of the structure by an applied magnetomotive force may be completed in whole or in part through the side rails and through any other rung, including the last rung of the structure. Which rung and to what extent that rung is actually used for flux completion will depend upon which rungs are available as will be explained in detail hereinafter.

Each of the rungs, and advantageously thought not necessarily, each of the side rails are flux limited. That is, more specifically, in the normal case a minimum cross section of each of these elements is held to a predetermined fixed dimension such that each element is limited in flux capacity in predetermined multiples of a particular flux value. As a result, a flux induced in one of the rungs is completed through a flux path defined by the nearest rung through which a flux can pass without regard to the magnitude of the applied magnetomotive force. As will be described in detail hereinafter, this operation makes possible the generation of logic functions in an illustrative logic circuit without regard to critical drive current limitations as has been necessary heretofore, with obvious advantages in terms of higher operating speeds and wider operating margins.

In the arrangement described in the co-pending application cited, a flux is induced in the first rung of the structure, which flux is completed through the last rung of the structure unless some flux short circuit is presented through intermediate rungs. Such a short circuit will be provided unless all of the intermediate rungs are rendered unavailable to the induced flux. In the latter case the completion of the induced flux through the last rung will induce an output voltage in an output winding coupled thereto. Thus in the foregoing arrangement an activating winding is coupled only to the first rung to thereby control a single switching flux through the structure and only a single output winding is coupled to the last rung to detect flux excursions only in that rung.

In the present invention an illustrative structure similar to that described in the foregoing co-pending application, having a first, a second and third, and a last rung will be assumed. According to a feature of this invention, however, an activating winding is coupled to each of the first and last rungs such that an activating current pulse simultaneously applied to each will control a switching flux at both ends of the structure. This dual switching operation makes possible the exercise of control of flux changes in each of the other rungs rather than in each of the alternate rungs as was the case in the arrangement described in the foregoing co-pending application.

Accordingly, it is another feature of this invention that an input winding may be inductively coupled to each of the remaining rungs, and in the above illustrative structure being generally described, such an input winding is coupled to each of the second and third rungs. Reset windings are coupled in a series relationship to bridging portions of one of the side rails between the first and second rungs, and third and last rungs, respectively.

By introducing a switching flux into both of the end rungs according to the present invention it becomes possible to control to a greater extent than has been hitherto possible the extent of the flux changes in each of the rungs including the rungs in which the switching flux is introduced. Thus it is another feature of this invention that output windings may be coupled to any or all of the rungs of the structure, in which output windings combinations of output signals may be induced representative of particular combinations of inputs.

Assuming in the above structure a complete absence of magnetization, when a first reset current pulse is applied to the serially connected reset windings, which windings are coupled to the side rails in the same sense, the resulting magnetomotive force will induce an initial magnetization in the flux path defined by the first and second rungs and also in the flux path defined by the third and last rungs. The flux thus established in each path will be in the same direction, that is, rungs one and three will be magnetized in one direction and rungs two and four will be magnetized in the opposite direction. Furthermore, the bridging portions of the side rails between rungs two and three also present closed flux loops in each of which a closed flux may be regarded as established. If an activating current pulse is now applied to the activating windings of the first and last rungs in a direction such as to switch the flux direction in each of those rungs, substantially all of the new flux in rung one will be completed through rung two and substantially all of the new flux in the last rung will be completed through rung three. The flux direction in the rungs two and three will be reversed and the switching fluxes will be completed through rungs two and three respectively no matter what the amplitude of the activating current applied. In other words, the voltage induced across the windings of the second and third rungs during the above flux switching corresponds to virtually a complete flux reversal in the first and last rungs.

Assume in the next step in the development of the principles of this invention that simultaneously with the application of the activating current pulse to the windings of the first and last rung, a current pulse is also applied to the input winding of the second rung in a direction such that the magnetomotive force developed thereby will hold the flux in the second rung in the direction in which it was initially magnetized. The switching flux induced in the first rung by the applied activating current will now be denied access to the path defined by the second rung since now no flux switching can occur in the latter rung. The next shortest flux path is that presented by the rung three. However, from the viewpoint of the switching flux in the first rung this path is also unavailable. The direction of the flux through the latter rung, it will be recalled, is already in the direction of the switching flux, and, more importantly, this rung, because of its flux carrying limitation, is already completely saturated and accordingly offers a reluctance approximating that of air to the switching flux of rung one. The closest flux path left available in which the latter switching flux may be completed now is that defined by the last rung and here flux switching can occur.

A switching flux is also induced in the last rung by the applied activating current which flux will also act to complete itself through the closest available magnetic path or short circuit. For part of the latter flux this path is advantageously provided as established by the switching flux induced in the first rung. Since the switching flux in the last rung is in a direction opposite to that initially established in rung three, the latter switching flux may be partially completed by partially switching the flux in that rung. Thus, as a result of the applied activating current pulse, rung one is partially switched, rung three is partially switched, and the last rung is completely switched.

According to one of the features previously stated, another input current pulse may be applied to the input winding coupled to the third rung to advantageously also control flux reversals in that rung. Thus by controlling complete or partial flux switches in each of rungs two and three by means of controlling input current pulses, the extent of flux switching may also be controlled in the first and last rungs and, advantageously, also in the side rails. An output winding may be provided for each of the rungs or for selected ones of the rungs in which, in the conventional manner, output voltages are induced as a result of flux excursions in the associated rungs. These output voltages may be arithmetically added to provide a resultant signal indicative of the combination of input current pulses introduced into the circuit via the input windings. Upon the application of a subsequent reset current pulse to the reset windings, the flux in the various flux paths of the rungs will be restored to that described above for the initial magnetic state of the structure.

To facilitate the description of the operation of this invention the remanent flux in each of the rungs of the illustrative structure may advantageously be thought of as being physically separated into the quantitative multiples referred to hereinbefore and, further, that each of these multiples may be independently reversed in direction. Obviously the operation of the present invention may also readily be described in terms of the conventional hysteresis loop which graphically represents the magnetic flux switching phenomenon. In the latter case, the partial switching of the flux in the rungs would be represented as an excursion of the entirety of the flux from a point of remanence on the B axis of the loop to some point in the direction of opposite remanence. Since in the illustrative arrangement being generally described, the opposing magnetomotive forces in those rungs are of equal magnitude, the flux excursion in each would be substantially to a point on the H axis of the loop. That is, the partially switched rungs are effectively demagnetized after the application of an activating current pulse.

According to one aspect of this invention the structure and manner of operation as described in the foregoing may advantageously comprise a logic circuit capable of performing an AND function. Thus if the input current pulse applied to the input winding of the second rung is considered to represent a first variable $x$ and the input current pulse applied to the input winding of the third rung represents a second variable $y$ then a particular resultant output signal will result if an $x$ occurs during $y$. By extending the structure to include additional rungs, a wider range of variables than that described may obviously be supplied. Also by applying more than one winding on a rung OR functions may additionally be performed.

The ladder structure of this invention may also readily be employed as a memory device. As described above, a plurality of input variables may be combinatorially introduced into the structure to produce an output signal when a function has been successfully generated. The resulting rearrangement of the existing flux in the various flux paths, however, remains due to the remanent property of the ferrite material. Only a reset current pulse applied to the reset windings in the illustrative structure being considered will serve to restore the various flux loops to their initial pattern. This reset current pulse may be timed to occur after any interval as determined by the memory requirements of the particular circuit application. When the flux is ultimately restored to its initial condition, output voltages will again be generated across the windings of the associated rungs in the opposite direction and these latter output voltages will also be representative of the function generated earlier.

Advantageously, no upper limit as far as the magnetic structure is concerned exists for any of the operational current pulses applied to the various windings of the structure. For the windings which must actually perform a flux switching function the conventional condition obtains that the applied current pulse be of a minimal value such that the necessary flux switching may be completed. However, the current pulses representing input variables applied to the windings in the rungs in which the flux need merely be maintained in a particular remanent direction need only be of a value such as to accomplish this flux holding function. Since these current pulses perform no actual flux switching, a considerable saving in the power requirements may be realized over conventional core circuits where some flux switching must in any event occur.

Because of the substantial reduction in power requirements above mentioned, in every case in which it is necessary merely to exert a holding magnetomotive force, single turn windings are advantageously employed. In conventional core circuit applications where the flux switching in one core may be dependent upon the switching of flux in a preceding core, multi-turn windings have invariably been necessary. Accordingly, the construction and assembly of magnetic logic circuits employing the structure of the present invention in conjunction with printed circuit techniques and the like may be substantially simplified.

The versatility of the logic circuit may be increased by adding input and output windings also to selected portions of the side rails of the structure such that control of flux reversals in those members may also be effected. The additional output signals thus made available advantageously extend the range of possible logic functions which may be accomplished. Each function is represented by a unique combination of flux changes and by a proper addition of output voltages from the output windings, a separate output lead may conveniently be obtained for each function if necessary.

Figure 4:
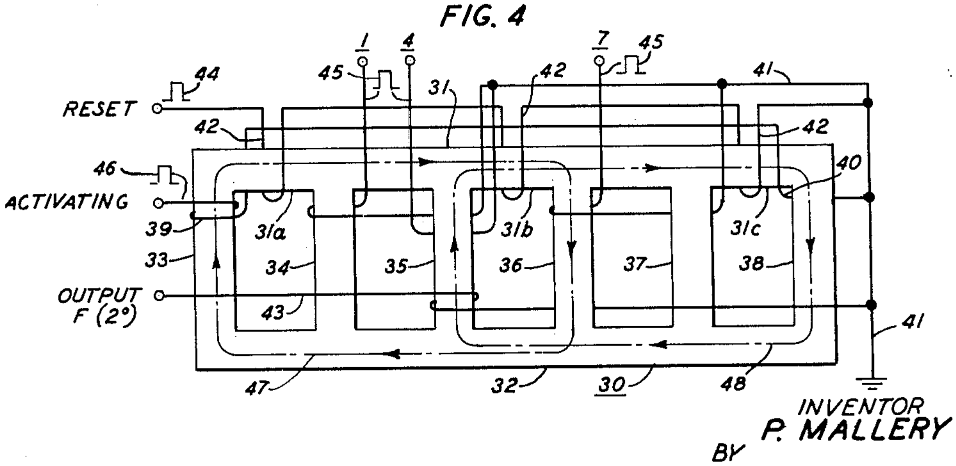

The foregoing and other objects and features of this invention together with the organization and structure thereof may be better understood from a consideration of the detailed description thereof which follows when taken in conjunction with the accompanying drawing, in which:

FIGS. 1*a* and 1*b* depict an illustrative embodiment of this invention with the magnetic flux distribution symbolized therein at two stages of operation;

FIG. 2 presents in tabular form the combinations of complete and partial flux reversals in the members of the illustrative embodiment of this invention shown in FIG. 1*b*, corresponding to the functions which may be generated;

FIG. 3 depicts a graph showing in idealized form resultant output signals appearing on the output conductors during the generation of any of the functions in the illustrative embodiment of FIG. 1*b*; and FIG. 4 shows another illustrative embodiment of this invention comprising a code translator.

A specific illustrative embodiment of this invention is a logic circuit capable of performing all functions of a pair of varables, X and Y, plus their negation, as shown in FIGS. 1*a* and 1*b*. The circuit comprises a magnetic structure 10 having a pair of side rails 11 and 12 and a plurality of transverse members 13 through 16. For the embodiment of this invention being described as representing the principles of this invention, each of the members or rungs 13 through 16 of the ladder-like structure 10 is formed of a magnetic material displaying substantially rectangular hysteresis characteristics, such as, for example, Cadmium Manganese Ferrite. Each of the members 13 through 16 additionally is flux limited, that is, more specifically, in the normal case, each of the rungs has the same minimal cross-sectional dimensions such that each is limited to the same extent in its flux carrying capacity. In the embodiment presently being described, the side rails 11 and 12 are also advantageously but not necessarily, of the same material and flux limited. The entire structure may conveniently be formed from a single sheet of stock by methods well known in the magnetic ferrite art.

A pair of reset windings 17 are inductively coupled to bridging portions of one of the side rails, such as the bridges 11*a* and 11*c* of the side rail 11. The latter windings 17 are serially connected between ground and a reset current pulse source 18. During the reset phase of the operation of the logic circuit a reset current pulse such as the positive pulse 25 is serially applied to the windings 17 from the reset pulse source 18. Referring to FIG. 1*a* of the drawings, the sense of the windings 17 is seen to be such as to induce a magnetic flux in the structure 10 in a pattern as symbolized by the broken lines, with the arrows indicating the direction of flux. The flux distribution is shown as being divided such that two magnetic circuits are completed in each flux path. At this point it is to be understood that the particular flux representation selected is employed only to facilitate the description of the effects of the flux action within the physical structure of the magnetic element 10 and is not necessarily to be understood as representing the actual physical states obtaining in the structure during the operation of the switch. Thus, the operation of this invention may equally well be described in terms of well-known theories of magnetic phenomenon and, particularly, reference will also be had herein, where considered clarifying, to the conventional B-H hysteresis loop representing the excursion of flux from one condition of magnetic saturation to the other. The particular representation employed in FIGS. 1*a* and 1*b* also conveniently serves to illustrate that all of the flux possible in the structure 10 is physically restricted by the dimensions of the structure. Before proceeding to the further details of the organization of the embodiment of FIGS. 1*a* and 1*b* the magnetic flux states of the magnetic structure 10 of this invention will be described with specific reference to FIG. 1*a*.

In accordance with the principles of this invention, the fluxes induced by the current pulse 25 will be completed via the shortest possible paths, which in the present case will be via the bridge 11*a*, rung 14, bridge 12*a*, and rung 13 for the first winding 17, and via the bridge 11*c*, rung 16, bridge 12*c*, and rung 15 for the second winding 17. Since the windings 17 are in the same sense, the induced flux in each closed path will be in the same direction, that is, down in the rungs 13 and 15 and up in the rungs 14 and 16, as viewed in FIG. 1*a*. Each of the rungs 13 through 16 is flux saturated due to its flux limitation. The bridges 11*b* and 12*b* each shows a minor closed flux loop and may obviously be assumed as in an unmagnetized state. Due to the remanent characteristic of the magnetic material the flux will remain in the distribution pattern as symbolized in FIG. 1*a* after the termination of the pulse 25. The foregoing distribution pattern is the normal magnetic state of the structure 10 and is the pattern to which the structure 10 is returned after each generation of a function by means of the additional circuit elements which may now be described with specific reference to FIG. 1*b*. Since FIGS. 1*a* and 1*b* show the same arrangement at different stages in its development herein, the same reference characters are used to designate identical elements.

Coupled to the second and third rungs 14 and 15, respectively, are input windings 19 and 20 connected between a ground bus 21 and the sources of input information 22 and 23 supplying the variables X and Y, respectively. A pair of activating windings 24 and 25 are coupled in opposite senses to the first and last rungs 13 and 16, respectively. The latter windings are serially connected together between the ground bus 21 and an activating current pulse source 26. A plurality of serially connected information output windings are inductively coupled to the rungs and a bridging portion of a side rail of the structure 10 in accordance with each of the functions which is to be generated. For simplicity the output windings are shown in FIG. 1*b* as conductors passing beneath or around the rungs when inductively coupled thereto and above the rungs when not so coupled. Also for the sake of simplicity the conductor windings are designated by the particular functions to which the output signals on each correspond. Obviously, in the actual assembly of the circuit the windings will be threaded in a manner which proves most expeditious for the particular circuit application. Each of the information output windings is connected between the ground bus 21 and information utilization circuits, not shown. The latter circuits may comprise any of the circuits well known in the art capable of using the output signals generated to represent the various functions and need not be described in detail herein for an understanding of the present invention.

The conductor windings X'Y' on which appear the output signals representing that function are inductively coupled to the rung 14 and side rail 12*b*, the windings XY' on which appear the output signals representing that function are inductively coupled to the rungs 13 and 16 as are the windings X'Y on which appear the output signals representing that function. Inductively coupled to the rungs 14 and 15 and also to the bridge 12*b* of the side rail 12 are the windings XY on which appear the output signals corresponding to that function. The windings upon which appear the output signals representing the function $X+Y'$ are inductively coupled to the rungs 14, 15, and 16, and the windings on which appear the output signals corresponding to the function X' + Y are inductively coupled to the windings 13, 14, and 15. Also coupled to the rungs 14 and 15 are the windings upon which appear the output signals corresponding to the function X' + Y', and coupled to the rungs 14 and 15 and the bridge 12*b* of the side rail 12 is an information output winding upon which appear the signals corresponding to the function X + Y. The sense of each of the couplings as shown in FIG. 1*b* is determined by the particular output signals demanded to represent the functions generated as will become apparent hereinafter.

The current sources 18, 22, 23, and 26 may conveniently comprise any of the current sources well known in the art suitable for providing the necessary current pulses as described herein. However, in view of the feature of this invention effectively eliminating upper margins for such currents, considerably more freedom is obviously exercisable in selecting suitable power sources. Accordingly, the associated circuits employed with the illustrative embodiment being described will not require a detailed description herein for an understanding of this invention.

As previously described, during the reset phase of operation of the switch a flux pattern is established therein as shown in FIG. 1*a* which is the flux pattern that will be assumed at this point. The generation of each of the functions possible with the circuit of FIG. 1*b* is accomplished by rearranging this normal flux pattern into a particular new pattern representative of the function to be generated. Each such rearrangement involves complete or partial flux reversals in the rungs 13 through 16 and side rails 11 and 12 in predetermined combinations. For purposes of description the generation of an illustrative function $F=X'Y$ will be assumed. In this case, during the input phase of operation information input current pulses corresponding to the variables X' and Y are introduced into the circuit via the input windings 19 and 20, respectively. That is, in this illustrative operation, no current pulse will be applied to the winding 19 representative of the primed variable X and a positive current pulse 27 will be applied to the input winding 20 representative of the variable Y. The polarity of the pulse 27 and the sense of the winding 20 are such that the magnetomotive force generated drives and holds the flux in the rung 15 in the direction in which it was previously set by the reset pulse 25. Thus the magnetic flux in the rung 15 will remain in the direction symbolized by the broken lines in FIGS. 1*a* and 1*b*. As a result, no flux reversal occurs or can occur in rung 15 at this time. Substantially simultaneously with the application of the pulse 27 to the winding 20 an activating positive current pulse 28 is applied to the serially connected activating windings 24 and 25 inductively coupled to the rungs 13 and 16, respectively. The polarity of the pulse 28 and the sense of the windings 24 and 25 are such that the magnetomotive forces generated thereby tend to drive all of the flux in the rungs 13 and 16 in directions opposite to those represented in FIG. 1*a*. In accordance with one of the features of this invention the current pulse 28 may be of a magnitude to substantially overdrive the rungs 13 and 16 to thereby increase switching speed.

The extent to which the flux in the rungs 13 and 16 is reversed by the applied magnetomotive forces will obviously depend upon the paths available for the switching flux in each rung. Since, as previously explained, no flux reversal can take place in the rung 15, this path is completely denied to the switching flux induced in either the rung 13 or 16. The next possible path for completion of the switching flux in both the rungs 13 and 16 is obviously through the path of rung 14. Since no operative current was applied to the winding 19 in accordance with the function to be generated, no external fields act upon the flux in the latter rung at this time. As a result, either complete or partial switching can take place in rung 14 and the path through this rung is accordingly available to the switching flux in either the rung 13 or 16. The flux limitation of each of the rungs, however, presents another control on the particular path or paths to be followed by the switching flux. The flux in the held rung 15, for example, must still find a path or paths for completion, and, under the direction of the applied fields, this is found by dividing substantially equally between its original total path through rung 16 and one of the paths through rung 14. As a result, the flux in both of the rungs 14 and 16 is also limited to only a partial reversal so that these rungs are only partially available to the switching fluxes induced by the applied magnetomotive forces.

Thus, to the switching flux induced in the rung 13, only the rungs 14 and 16 are partially available and to the switching flux induced in the rung 16, only the rung 13 is available and that completely so. Since only a partial switching can occur in the rung 16, this flux is completed as a part of the excursion of the flux in rung 13. The drives on each of the rungs 13 and 16 as a result of the applied current pulse 28 co-operate to cause an effective merging of the induced switching fluxes. Since a path still remains through the rung 14 for a complete switching of the flux in rung 13, this follows to permit a complete excursion of the flux in rung 13 from one of its points of magnetic remanence to the other. The foregoing rearrangement of the initial flux distribution of FIG. 1*a* is symbolized in FIG. 1*b*. Obviously the flux excursions in the rungs 14 and 16 may also readily be explained by reference to the conventional hysteresis loop. The latter excursions would in that case be represented as having passed from a point of remanence on the B axis to a point substantially near the H axis, that is, the rungs 14 and 16 may now be considered as substantially unmagnetized.

As a result of the foregoing flux pattern rearrangement, the flux in the rung 13 was completely switched, and the flux in each of the rungs 14 and 16 was partially switched. The flux in the rung 15 was neither partially nor completely switched. The output windings corresponding to the function X'Y, it will be recalled, where inductively coupled only to the rungs 13 and 16 and only the flux excursions in those rungs will be effective to induce output signals in the output winding X'Y. Accordingly, the signals induced by the partial excursion in the rung 16 and the complete switching in the rung 13 will be representative of the function generated. Obviously, only a single resultant output signal will appear on the series-connected winding X'Y, the polarity and magnitude of which will depend both upon the direction of the total flux changes in the rungs 13 and 16 and also upon the sense of the output windings. Where flux changes in more than one rung induce output signals in serially connected output windings, the latter signals are arithmetically added to achieve the resultant signal indicative of the function generated. Should the input information in the above operation not have corresponded to the function to be generated, the fields generated by the input current pulses would not have acted upon the flux pattern in the manner described and, consequently, whatever other rearrangement of the flux pattern that took place would have served to induce another and different resultant signal on the selected output lead. Thus, each of the output conductor windings would have an output signal induced thereon during the generation of each of the functions possible with the circuit of FIG. 1*b*. The direction of the flux changes in each of the rungs and the sense of the output windings in each case, however, are advantageously selected such that for each direct function generated discrimination need only be made by associated utilization circuits, not shown, between a positive output signal and negative signals or between a positive output signal and the absence of a signal. In the generation of the negation of the functions the discrimination in each case need only be made between the absence of a signal and positive signals. A comparison of the output signals appearing on each of the output conductor windings corresponding to the possible functions will be readily understood from a consideration of the table shown in FIG. 3 to be explained hereinafter.

In the subsequent phase of operation of the logic circuit of FIG. 1*b*, a reset pulse 25 is again applied to the windings 17 and the magnetic flux distribution is restored to the pattern as symbolized in FIG. 1*a*. Since flux excursions also take place in the rungs 13, 14, and 16 during this phase of operation, a resultant output signal is also induced in the output winding X'Y at this time. The extent of the flux reversal in the latter rungs will be the same as that taking place during the input phase of operation; however, the flux reversals and the polarity of the resultant output signal induced will be in the opposite direction. Since the reset pulse 25 is applied at a time subsequent to that of the introduction of the input variables, the memory ability of the illustrative arrangement of FIG. 1*b* is clearly demonstrated. The resultant output signals, although opposite in polarity, are separated in time and are both representative of the generation of the desired function. Accordingly, these output signals may be utilized to achieve either simultaneous or sequential operation depending upon which of the signals is accepted as controlling.

In a similar manner to that described above, the other functions indicated as representing the output windings in FIG. 1*b* may be generated. The combinations of complete or partial flux switching in each of the rungs 13 through 16 and in the bridge 12*b* corresponding to each of the functions, are set forth in tabular form in FIG. 2. Since, in the illustrative embodiment being described, each of the rungs is assumed to be flux limited in multiples of two of a particular flux magnitude as symbolized by the pairs of broken lines in FIGS. 1*a* and 1*b*, a complete flux reversal is represented by a "2," a partial flux reversal by a "1," and no flux change by a "0."

The rearrangement of the initial flux pattern for the generation of any of the possible functions of the illustrative arrangement of FIG. 1*b* may readily be determined by reference to the table of FIG. 2. For the function, say, $F=XY$, in which input holding currents are applied to both of the input windings 19 and 20 simultaneously with the application of an activating current to the activating windings 24 and 25, the rearrangement of the initial flux pattern involves the following flux reversals in the rungs: rung 13 undergoes a partial flux reversal, in rungs 14 and 15 the flux is held unswitched, and the rung 16 and bridge 12_b_ each undergo a partial flux switch. In each case the reversals are in a direction opposite to that indicated in FIG. 1_a_. Since the negation of the illustrative function $F=XY$ is $F'=X'+Y'$, the combination of flux reversals representative of that negation would be any combination other than that representative of the function as a comparison of the reversals in the table of FIG. 2 demonstrates.

As previously stated, the sense of the output windings with respect to the particular direction and extent of the flux change within the rungs is selected in accordance with the particular function being generated. Similarly, combinations of output windings are serially connected to the same end to obtain unique resultant output signals to represent the functions generated. The latter output signals are shown in idealized form in the table of FIG. 3. Thus for the above illustrative function F=XY the resultant output signal on the conductor winding XY is seen to be a positive signal of a one quarter magnitude. At the same time that the foregoing function is generated, the following conditions appear on the remaining AND function output conductors: on the X'Y' conductor, a negative signal of a one quarter magnitude; on both the XY' and X'Y conductors, no signal. Discrimination thus need only be made between a positive and negative signal and a positive signal and the absence of a signal. By comparing the sense of the particular combinations of output windings of FIG. 1_b_ with the flux changes tabulated in FIG. 2, the derivation of the signals listed in FIG. 3 may readily be ascertained. For each of the remaining AND functions a unique positive signal representative of the function and incidental irrelevant signals are also obtained as an inspection of the table of FIG. 3 demonstrates.

For the negation of each of the AND functions the representative output condition on the corresponding output conductor selected is that of an absence of signals. Thus, any absence of signals on the corresponding negation output conductor during the generation of the negation of a particular function will be representative of the negation of that function. The unique significance of the absence of a signal in each case is also clear from a comparison of the output signals depicted in the table of FIG. 3.

The principles of this invention are not limited in their application to the generation of the functions described in connection with the embodiment of FIG. 1_b_. By extending the structure of this invention to include additional rungs the number of variables which may be handled may be substantially increased. Thus, additional windings similar to the input windings 19 and 20 of FIG. 1_b_, may then be provided to receive the additional variables to be handled. In accordance with the foregoing expansion another illustrative embodiment of this invention comprising a two-out-of-five code to binary translation circuit may be achieved. Such an illustrative translation circuit is shown in FIG. 4, and comprises a magnetic structure 30 having a pair of side rails 31 and 32 which in turn have a plurality of transverse members or rungs disposed in a spaced relationship therebetween. For the particular translation to be accomplished, six such rungs 33 through 38 are provided. The side rails 31 and 32 and/or the rungs 33 through 38 each also display the magnetic hysteresis characteristics of the corresponding elements of the circuit of FIG. 1_b_ as previously set forth herein and the latter elements are also flux limited also in the manner previously described. A pair of activating windings 39 and 40 are inductively coupled to the rungs 33 and 38, respectively, and are serially connected between a ground bus 41 and a source of activating current, not shown. A reset winding 42 is inductively coupled to each of the bridging portions 31_a_, 31_b_, and 31_c_ of the side rail 31, respectively. The latter reset windings are serially connected between the ground bus 41 and a source of reset current pulses, also not shown. A plurality of input windings are coupled to the rungs 34 through 37 in accordance with the particular translation to be performed. For simplicity the individual windings are shown in FIG. 4 as conductors looping the associated rungs, the input conductor windings being designated simply by the two-out-of-five digits to be translated. The conductor 1 is coupled to the rungs 34 and 35 and the conductor 4 is coupled to the rung 35 alone. Conductor 7 is coupled to the rungs 36 and 37. An output conductor winding 43 is coupled to the rungs 35 and 36 and is connected at one end to the ground bus 41. For simplicity all of the windings are shown in FIG. 4 as passing beneath or around the rungs when coupled thereto and above the rungs when not so coupled in accordance with the convention previously established herein. The associated current pulse sources which are understood to supply the suitably timed operating information, activating, and reset currents to the group of input windings 1, 4, and 7, the activating windings 39 and 40, and the reset windings 42, respectively, are not shown in connection with the embodiment being described. These current sources may also comprise circuits well known to those skilled in the art and a detailed description is also not necessary with respect to these for an understanding of the embodiment of FIG. 4. Similarly, a utilization circuit to which the output signals of this embodiment may be understood as being transmitted may also be of the character well known in the art.

The organization of the input and output windings of the embodiment of this invention described in the immediately foregoing is based on the relationship of the well-known two-out-of-five code and the binary code for each binary-bit function. Thus, reference to a two-out-of-five to binary translation table makes clear that a Boolean equation may be set up for the function of each binary bit $2^3$, $2^2$, $2^1$, and $2^0$. Further inspection of the well-known translation table shows the particular function $F(2^0)=17'+7(0+2)$ to be the most extreme function that is met in the illustrative translation and accordingly this function is selected to illustrate the versatility of the present invention. To further simplify the structure in the performance of this function, the function is advantageously rewritten in the equivalent form $F(2^0=17'+1'4'7$. Consideration of the circuit shown in FIG. 4 demonstrates the generation of the latter function. The operation of the embodiment of FIG. 4 will be described without recourse to the symbolized flux distribution indicated in connection with the operation of the circuit of FIGS. 1_a_ and 1_b_. However, it wil be assumed that a similar hypothetical flux distribution results after the application of the various operating current pulses to the windings.

Assuming a previous application of a positive reset current pulse 44 to the reset windings 42, a flux pattern will have been established, in the manner described hereinbefore, in which the flux in the flux circuits defined by the rungs 33, 35, and 37 is down, as viewed in FIG. 4 and the flux in the flux circuits defined by the rungs 34, 36, and 38 is up, also as viewed in FIG. 4. The circuit is now prepared for the introduction of the information input variables therein in accordance with the translation to be accomplished. In this phase of operation, positive input current pulses 45 are selectively applied to the conductor windings 1, 4, and 7. Specifically, in the first term 17' of the sum-of-products expression of the function to be performed in the illustrative translation, a current pulse 45 is applied to the conductor winding 1. The latter winding is seen in FIG. 4 to be coupled to the rungs 34 and 35 in opposite senses such that the magnetomotive forces developed are in a direction with respect to each rung such as to drive and hold the flux therein in the direction previously established. In accordance with this term of the expression no current pulse is applied to the winding 7 to represent the negation of this value. Simultaneously with the application of the input currents to the windings 1, 4, and 7, a positive activating current pulse 46 is applied to the series-connected activating windings 39 and 40. The latter windings are wound in a sense such that the magnetomotive forces developed apply a full switching force to the rungs 33 and 38. All of the flux in the later rung can be switched since an available closure path is at this time presented through the rung 37. The held flux in the rung 34 divides to complete itself partially through rungs 33 and 35 and, as a result, the flux in rung 33 can only be partially switched. The rung 35 is unavailable to the switching flux induced in rung 33 by the activating current since rung 35 is already saturated in the direction of the latter switching flux. Accordingly, the part of the flux in rung 33 which is switched is completed through the closest available path defined by the rung 36. The path of the switching flux induced in the rung 33 during the generation of this function is represented in FIG. 4 by a broken line 47, the direction being indicated by the arrows. As a result, the flux in the latter rung is also partially switched. Since the output conductor winding for this function is coupled to the rung 36, an output voltage representative of this function will be generated therein. The direction of the flux switch in the coupled rung 36 is such that this output voltage is a positive signal. Since no flux switching took place in the rung 35 to which the output control winding is also coupled, no other signal will appear as an output during the generation of this term of the translation.

Since the illustrative function of this translation is a sum-of-products expression, one other combination of input conditions obviously also satisfies the equation. Thus, in accordance with the term 1′4′7 of the illustrative expression, inputs may also be applied to the conductor windings 1, 4, and 7 in accordance with that term. Specifically, in accordance with the negation of the values 1 and 4, no input current pulses are applied to the input conductor windings so designated. Thus a positive input current pulse 45 is applied only to the conductor winding 7. The latter winding is seen in FIG. 4 to be coupled to the rungs 36 and 37 in opposite senses, also with the result that the magnetomotive forces developed drive and hold the fluxes in those rungs in the direction previously established. The rearrangement of the flux pattern at this time takes place in a manner analogous to that described for the other term of the expression. Thus upon the simultaneous application of the activating current pulse 46 to the windings 39 and 40, all of the flux in the rung 33 will be completely switched, the switching flux finding a ready path for completion by switching the flux in the rung 34. At this time the held flux in the rung 37 divides to complete itself partially through the rung 36 and the rung 38. As a result only a partial switching of the flux in the rung 38 can occur and this switching flux finds its closest available path for completion through the rung 35 in which rung a partial flux switch occurs. The latter switching flux is indicated by the broken line 48 in FIG. 4, the direction also being indicated by the arrows.

Since the output conductor winding for the illustrative translation is also coupled to the rung 35, the partial switching in that rung induces an output voltage in the winding also representative of the function $F(2^0)$. As may be seen from FIG. 4, the sense of the output winding and the direction of the flux switch in the rung 35 is such that the output voltage at this time will also be a positive signal. Thus the OR relationship between the terms of the bit-function of the illustrative translation is satisfied. A subsequent reset pulse 44 applied to the reset windings 42 will restore the magnetic structure 30 to its initial flux distribution pattern.

As explained hereinbefore, an output voltage will again be induced in the output winding at this time, which voltage may also be held as representing the translation from the two-out-of-five to the binary code.

The flexibility of a magnetic structure according to the principles of this invention is not limited to the specific embodiments described hereinbefore nor is the flux distribution and its operative arrangement to be understood as being restricted to the examples shown. Thus, for example, also contemplated as being within the scope of this invention are structures in which flux closures are traced through other predetermined flux paths. The particular information handling operation to be performed will normally control the structural configuration and flux distribution of the particular embodiment of this invention. The latter operation will also govern the distribution of input windings and their number on the rungs of the structure. It should be noted in the latter respect that in some applications it may prove advantageous to couple input or activating windings to selected bridging portions of the side rails.

The availability of particular associated circuit components may also dictate the manner of operating a logic circuit according to this invention. Thus, it has been assumed in the description of the foregoing specific illustrative embodiments that high impedance current sources are available for the introduction of the information input variables. Where a particular system affords low impedance voltage sources, this invention permits an advantageous means for holding the flux in a rung in its condition of magnetic remanence. If a shorted winding is coupled to a rung, any flux reversal in that rung will induce a corresponding current in the low impedance winding. The resulting field will then be in the direction such as to oppose the flux reversal and only a negligible flux reversal will be permitted. By introducing a voltage in the shorted winding of a polarity which opposes the induced current, completion of the flux reversal in the rung may be allowed. Thus, by controlling a voltage applied to the input winding rather than by applying a current thereto, the flux switching, and thereby the introduction of an input variable, may be controlled. In this manner constant current, high impedance sources representing the variables may be replaced by constant voltage, low impedance sources. Advantageously, the output windings of the rungs of the present invention present nearly such a constant voltage, low impedance sources with the result that a number of logic elements may conveniently be cascaded.

Accordingly, what have been described are considered to be only illustrative embodiments of the present invention and it is to be understod that numerous other arrangements may be devised therein by those skilled in the art without departing from its spirit and scope.

What is claimed is:

1. An electrical circuit comprising a first and a second plurality of magnetic elements each having a substantially rectangular hysteresis characteristic, means for inducing a flux of a particular polarity in each of said first and said second plurality of elements, means for completing flux paths from each element of said first plurality of elements through each element of said second plurality of elements, an activating winding for one element of said first plurality of elements and for one element of said second plurality of elements, an input winding for each of the others of said first and said second plurality of elements, means for energizing said input windings in accordance with information input variables to control flux reversals in the associated elements, means for simultaneously energizing each of said activating windings to reverse at least part of the flux of said one element of said first plurality of elements and said one element of said second plurality of elements, and output windings serially coupled to the elements of said first and said second plurality of elements energized responsive to flux reversals in said last-mentioned elements for generating an output signal indicative of said information input variables.

2. An electrical circuit comprising a magnetic structure having a plurality of members, each of said members having an equal flux limit in multiples of a particular flux value, each of said members also being capable of assuming stable remanent flux states of one or the other direction of a magnitude as determined by said flux limit, magnetic means for completing flux paths between each of the said members, means inductively coupled to said structure for inducing a normal remanent flux in each of said members to said flux limit, said flux in each member being completed through another member in the opposite direction, means for controlling the reversal of said flux in particular ones of said members in predetermined combinations comprising a winding coupled to each of said last-mentioned members and a current source for applying holding currents to said windings, means for inducing a switching flux in others of said members, said switching flux being completed to at least partially reverse the flux in said particular ones of said members in said predetermined combinations, and output windings selectively coupled to said plurality of members, said output windings being energizable responsive to flux reversals in associated members for generating an output signal indicative of said predetermined combination.

3. An electrical circuit comprising a magnetic structure comprising a pair of side rails having members transversely disposed in a spaced relationship therebetween, each of said members having a substantially rectangular hysteresis characteristic, said side rails and said members being flux limited in equal flux magnitudes, means for inducing a remanent magnetic flux of a predetermined flux value in each of said members, said flux being completed through said side rails and through another member in the opposite direction, means for controlling the reversal of the remanent flux in particular ones of said members in predetermined combinations comprising first windings inductively coupled to each except a first and a second of said members, and means including first current sources for selectively applying holding currents to said first windings; second windings inductively coupled to each of said first and second members, and means including a second current source for applying a switching current to said second windings to induce switching fluxes in said first and said second members, said switching fluxes being completed to cause at least partial reversal of the remanent flux in said particular ones of said members; and third windings coupled to each of said members energized responsive to flux reversals in said members for generating output signals indicative of said predetermined combinations.

4. An electrical circuit according to claim 3 in which said means for inducing said remanent flux in each of said members comprises fourth windings inductively coupled to one of said side rails and means including a third current source for applying a setting current to said fourth windings.

5. A switching circuit comprising a magnetic structure comprising a plurality of members, each of said members having a substantially rectangular hysteresis characteristic, magnetic means for completing a plurality of magnetic flux circuits between said members, said magnetic means and said members being equally flux limited, at least two of said circuits being completed through each of said members, means inductively coupled to said structure for inducing a magnetic flux in each of said circuits, control means inductively coupled to each except a first and a second of said members for controlling flux switching in particular ones of said circuits completed through said last-mentioned members in accordance with information input variables, means inductively coupled to said first and second members for applying a switching field to the flux circuits in said last-mentioned members, and an output winding coupled to each of said members, each of said output windings being energized responsive to flux switching in its associated member indicative of said information input variables.

6. A switching circuit according to claim 5 in which said control means comprises control windings and means including a current source for selectively applying holding currents to said control windings.

7. A switching circuit comprising a magnetic structure comprising a plurality of members each having a substantially rectangular hysteresis characteristic and magnetic means for completing flux paths between each of said members, said structure including each of said members defining a plurality of possible magnetic flux circuits of equal flux capacity, at least two of said circuits being completed through each of said members, means inductively coupled to said structure for inducing a magnetic flux in each of said circuits, inductive control means associated with each except two of said members for selectively controlling flux switching in the flux circuits therein in accordance with information input variables, means inductively coupled to each of said two members for applying a switching field to the magnetic flux in each of the circuits completed through said last-mentioned members, and an output winding inductively coupled to each of said members, each of said output windings being energized responsive to flux switching in the magnetic circuits completed through its associated member to generate output signals indicative of said information input variables.

8. A switching circuit according to claim 7 in which said inductive control means comprises control windings inductively coupled to each except said two of said members and means including current sources for applying holding currents to said windings.

9. A switching circuit according to claim 8 also comprising means for combinatorially interconnecting said output windings to achieve resultant signals also indicative of said information input variables.

10. A switching circuit comprising a pair of side rails having a plurality of transverse members disposed in a spaced relationship therebetween, each of said members having a substantially rectangular hysteresis characteristic, said side rails and each of said members defining a plurality of possible magnetic flux circuits of equal flux capacity, at least two of said circuits being completed through each of said members and said side rails, reset windings coupled to one of said side rails, means including a first current source for applying a reset current pulse to said reset windings to induce a magnetic flux in each of said circuits, control windings coupled to particular ones of said members and said side rails defining particular ones of said circuits, means including second current sources for selectively applying holding currents to said control windings in accordance with information input variables to control flux switching in said particular ones of said circuits, activating means for applying a switching field to a first and a second of others of said members, and output windings inductively coupled to said members energized responsive to flux switching in magnetic circuits completed through the associated member to generate output signals indicative of said information input variables.

11. A switching circuit according to claim 10 in which said activating means comprises an activating winding coupled to each of said first and second members and means including a third current source for applying an activating current to said activating windings substantially simultaneously with said holding currents applied to said control windings.

12. An electrical circuit comprising a plurality of magnetic elements each having a substantially rectangular hysteresis characteristic, means for completing flux paths from each of said elements through each of the others of said elements, each of said flux paths being flux limited in the same flux magnitude, means for causing a magnetic flux in each of said elements, said flux being completed through at least one other of said elements, an activating winding for a first and a second of said elements, means for selectively applying magnetic fields to others of said elements in accordance with information input variables, said fields controlling changes in flux in each of said others of said elements, means for applying an activating current to said activating windings, the flux in particular ones of said elements being partially or completely switched responsive to said activating current as determined by said magnetic fields, output windings for said elements including said first and said second elements energized responsive to said partial or complete switching to generate output signals, and means for combining said output signals in accordance with said information input variables.

13. An electrical circuit comprising a magnetic structure having a plurality of interconnected individual members, each of said members having a substantially rectangular hysteresis characteristic and being flux limited in equal flux magnitudes, a first and a second of said members defining a first magnetic flux path, a third and a fourth of said members defining a second magnetic flux path, means including reset windings associated with said paths for inducing a flux of one polarity in each of said paths, means including an input winding for each of said second and third members for partially and completely preventing flux reversals in said last-mentioned members in accordance with predetermined combinations of input conditions, means including an activating winding for each of said first and fourth members for simultaneously inducing a flux of the other polarity in said last-mentioned members, said last-mentioned fluxes being partially completed through said fourth and said first members, respectively, partially through particular ones of said second and third members as determined by said predetermined combinations of input conditions, and an output winding for each of said members energized responsive to flux reversals in said members for generating output signals indicative of said predetermined combinations of input conditions.

14. An electrical circuit comprising a magnetic structure having a first and a second member, each of said members having a substantially rectangular hysteresis characteristic and each of said members being flux limited in predetermined multiples of a particular flux value, said first and said second member defining a closed magnetic flux path, a plurality of other members in said structure, each of said other members also having a substantially rectangular hysteresis characteristic and each also being flux limited in predetermined multiples of said particular flux value, each of said other members providing a flux bypass for the flux in said first and said second members, means for selectively controlling the magnetic reluctance of each of said other members in accordance with predetermined combinations of input conditions, means including an activating winding coupled to each of said first and second members for simultaneously inducing a magnetic flux in said last-mentioned members, said last-mentioned fluxes being partially completed through said second and said first members, respectively, and partially through particular ones of said other members as determined by the reluctance of said other members, and output windings selectively coupled to said members energized responsive to flux completions through said members for generating output signals.

15. A magnetic control device comprising a pair of side rails having a plurality of transverse members disposed in a spaced relationship therebetween, said members each having a substantially rectangular hysteresis characteristic and each of said members being flux limited in predetermined multiples of a particular flux value, a first magnetic circuit including a first of said members, said side rails, and a second of said members, each of said other members defining a magnetic short circuit for said first magnetic circuit, means for inducing a magnetic flux in said first and said second members in one direction, means for simultaneously inducing a switching magnetic flux in said first and said second member, means for magnetically blocking said magnetic short circuits partially or completely in accordance with predetermined combination of input conditions, and output windings coupled to said members energized responsive to the partial or complete switching of flux in said members to generate output signals indicative of said predetermined combinations of input conditions.

References Cited in the file of this patent

UNITED STATES PATENTS

| | | |
|---|---|---|
| 2,519,426 | Grant | Aug. 22, 1950 |
| 2,733,424 | Chen | Jan. 31, 1956 |
| 2,869,112 | Hunter | Jan. 13, 1959 |